US012607765B2

(12) United States Patent　(10) Patent No.:　US 12,607,765 B2
　Banks　(45) Date of Patent:　Apr. 21, 2026

(54) METAL DETECTION APPARATUS WITH A TEST DEVICE AND TEST DEVICE

(71) Applicant: Mettler-Toledo Safeline Ltd., Manchester (GB)

(72) Inventor: Tom Banks, Salford (GB)

(73) Assignee: Mettler-Toledo Safeline Ltd., Manchester (GB)

( * ) Notice: Subject to any disclaimer, the term of this patent is extended or adjusted under 35 U.S.C. 154(b) by 115 days.

(21) Appl. No.: 18/433,008

(22) Filed: Feb. 5, 2024

(65) Prior Publication Data

US 2024/0288603 A1　Aug. 29, 2024

(30) Foreign Application Priority Data

Feb. 24, 2023　(EP) ..................................... 23158451

(51) Int. Cl.
　*G01V 3/10*　(2006.01)
　*G01N 27/02*　(2006.01)
　*G01V 13/00*　(2006.01)
(52) U.S. Cl.
　CPC ........... *G01V 3/107* (2013.01); *G01N 27/023* (2013.01); *G01V 13/00* (2013.01)
(58) Field of Classification Search
　CPC .......... G01V 3/107; G01V 3/10; G01V 13/00; G01N 27/023
　USPC ....................................................... 324/326
　See application file for complete search history.

(56) References Cited

U.S. PATENT DOCUMENTS

| | | | | |
|---|---|---|---|---|
| 2,237,254 A | * | 4/1941 | Broekhuysen .......... | B07C 5/344 |
| | | | | 209/535 |
| 2,992,450 A | | 7/1961 | Pittenger | |
| 3,361,962 A | * | 1/1968 | Albrecht ................ | G01V 3/107 |
| | | | | 324/243 |
| 3,675,660 A | * | 7/1972 | Girodat ................... | A01F 12/16 |
| | | | | 460/106 |
| 3,757,501 A | * | 9/1973 | Bennett, Jr. ............ | G01V 3/107 |
| | | | | 56/DIG. 15 |
| 3,889,249 A | * | 6/1975 | Bennett, Jr. ............ | G01V 3/107 |
| | | | | 340/684 |

(Continued)

FOREIGN PATENT DOCUMENTS

JP　　　4570820 B2　10/2010

*Primary Examiner* — Christopher P McAndrew
(74) *Attorney, Agent, or Firm* — Standley Law Group LLP; Jeffrey S. Standley; Adam J. Smith

(57) ABSTRACT

A metal detection apparatus includes a detector housing with input and output apertures delimiting a transfer channel for moving products through a coil system with a transmitter coil for inducing signals in receiver coils that do not compensate one another when a metal contaminant is in the detection zone. A test device includes at least one sample, a signal processing unit for processing the receiver coil signals and detecting signals relating to contaminants and the test sample, and a control unit for controlling measurement of products during normal operation and the sample during test intervals. The test device includes reel units at the input and output apertures, respectively, with drive units rotatably holding reels holding ends of an elongated windable sample carrier extending through the detection zone and holding the sample(s). Either or both of the reel drive units transfer the sample(s) through the detection zone during test intervals.

16 Claims, 7 Drawing Sheets

(56)                References Cited

U.S. PATENT DOCUMENTS

| | | | | |
|---|---|---|---|---|
| 3,896,608 A * | 7/1975 | Garrott | G01V 3/08 | 324/226 |
| 3,949,864 A * | 4/1976 | Montsant | B41F 15/085 | 101/118 |
| 3,950,696 A * | 4/1976 | Miller | G01V 3/08 | 340/568.1 |
| 4,258,323 A * | 3/1981 | Andrews | G01R 31/52 | 324/559 |
| 4,814,734 A * | 3/1989 | Moran | G01V 3/10 | 29/605 |
| 4,870,381 A * | 9/1989 | Moran | G01V 3/10 | 336/208 |
| 5,116,654 A * | 5/1992 | Cosman | F16L 1/11 | 324/67 |
| 5,572,121 A * | 11/1996 | Beswick | G01V 3/10 | 324/225 |
| 5,712,828 A * | 1/1998 | Luscombe | G01V 13/00 | 367/13 |
| 6,041,705 A * | 3/2000 | Lintner | B41F 15/10 | 101/116 |
| 7,061,236 B2 * | 6/2006 | Britton | G01V 3/105 | 324/239 |
| 7,471,764 B2 * | 12/2008 | Kaval | G01N 23/04 | 378/57 |
| 7,489,130 B2 * | 2/2009 | Behnke | A01D 75/187 | 56/153 |
| 9,618,464 B2 * | 4/2017 | Butterworth | G01V 3/10 | |
| 9,857,440 B2 * | 1/2018 | Ellison | G01R 33/0052 | |
| 10,444,174 B2 * | 10/2019 | Butterworth | G01N 27/023 | |
| 10,976,467 B2 * | 4/2021 | Griffin | G01V 3/08 | |
| 2004/0062346 A1 * | 4/2004 | Fernandez | G01V 5/228 | 378/57 |
| 2007/0209736 A1 * | 9/2007 | Deringor | B27B 31/06 | 83/365 |
| 2009/0021252 A1 * | 1/2009 | Simon | G01V 3/104 | 73/649 |
| 2009/0201024 A1 * | 8/2009 | Bosnar | G01V 3/107 | 324/344 |
| 2012/0257718 A1 * | 10/2012 | Kaval | G01N 23/04 | 378/57 |
| 2016/0291098 A1 * | 10/2016 | Ellison | G01V 3/105 | |
| 2018/0170679 A1 * | 6/2018 | Kruger | B65G 15/16 | |
| 2021/0394386 A1 | 12/2021 | Acciari et al. | | |

* cited by examiner

METAL DETECTION APPARATUS WITH A TEST DEVICE AND TEST DEVICE

CROSS-REFERENCE TO RELATED APPLICATIONS

This application claims priority to European Application EP23158451.7 filed on Feb. 24, 2023, the disclosure of which are hereby incorporated by reference as if fully restated herein.

TECHNICAL FIELD

The present invention relates to a metal detection apparatus equipped with a test device and to such a test device.

BACKGROUND AND SUMMARY OF THE INVENTION

A metal detection apparatus is used to detect and reject unwanted metal contamination in processed products. When properly installed and operated, it will help reduce metal contamination and improve food safety. Most modern metal detectors utilize a search head comprising a "balanced coil system". Detectors of this design can detect all metal contaminant types including ferrous, non-ferrous, and stainless steels in a large variety of products such as fresh and frozen products.

The metal detection apparatus typically comprises a metallic housing having input and output apertures with cross-sectional areas of different or equal sizes defining a travel path inside the enclosure along which an object under inspection moves. Apertures typically have a rectangular or circular form typically selected according to the product flow and/or product size.

A metal detection apparatus that operates according to the "balanced coil"-principle typically comprises three coils that are wound onto a non-metallic frame or yoke. The coil system comprises at least one transmitter coil and at least one first and at least one second receiver coil; the respective receiver coils bounding a detection zone inside the enclosure between the input and output apertures. The detection zone has a cross-sectional profile that varies or is constant along the travel path. Systems with cylindrical detection zones typically use coils having identical dimensions with the transmitter coil centred between the two receiver coils. Systems with conical detection zones use coils that differ in size from one another typically with the transmitter coil being off-center between the two receiver coils. In both systems, the coils are arranged such that, when the transmitter coil is energized by an alternating electric current, the electromagnetic field generated thereby induces a first voltage in the first receiver coils and a second voltage in the second receiver coil, the first and second voltages cancelling each other out when there is no metal present in the object under inspection.

As a particle of metal passes through the coil arrangement, the high-frequency field is disturbed first near one receiver coil and then near the other receiver coil. While the particle of metal is conveyed through the receiver coils the voltage induced in each receiver coil is changed. This change in balance results in a signal at the output of the receiver coils that can be amplified, processed, and subsequently used to detect the presence of metal contamination.

The signal processing channels typically split the received signal into two separate components that are 90° apart from one another. The resultant vector has a magnitude and a phase angle, which is typical for the products and contaminants conveyed through the coil system. In order to identify a metal contaminant, "product effects" need to be removed or reduced. If the phase of the product is known, then the corresponding signal vector can be reduced. Eliminating unwanted signals from the signal spectrum thus leads to higher sensitivity for signals originating from contaminants.

Distinguishing between the phases of the signal components of different origins by means of a phase detector allows obtaining information about the product and the contaminants. A phase detector, e.g. a frequency mixer analogueor circuit, generates a voltage signal which represents the difference in phase between the signal input, such as the signal from the receiver coils, and a reference signal provided by the transmitter unit to the receiver unit. Hence, by selecting the phase of the reference signal to coincide with the phase of the product signal component, a phase difference, and a corresponding product signal is obtained at the output of the phase detector that is zero. If the phase of the signal components that originate from the contaminants differs from the phase of the product signal component, then the signal components of the contaminants can be detected. However, if the phase of the signal components of the contaminants is close to the phase of the product signal component, then the detection of contaminants fails since the signal components of the contaminants are suppressed together with the product signal component. Preferably, the metal detection apparatus allows therefore selecting one of a plurality of transmitter frequencies for which the phase of the signal components of the metal contaminants will be out of phase with the product signal component.

After calibration, the metal detection apparatus provides the specified performance, which however may degrade in time due to drift effects. Instead of recalibrating the metal detection apparatus in short intervals, the performance of the metal detection apparatus is preferably tested and calibration is only done when test results indicate a need for recalibration.

Hence, for testing and optimising a metal detection apparatus, tests with one or preferably a plurality of different test samples, which correspond to contaminants, are performed. Manually executing test procedures by entering a test sample into the metal detection apparatus is time-consuming and cumbersome. Modern metal detection apparatuses are therefore equipped with a test device that can automatically be operated.

U.S. Pat. No. 10,444,174B2 discloses a metal detection apparatus with a test device that can perform tests automatically. The test device comprises one or more tubes extending into one of the apertures of the metal detection apparatus. Each tube is provided with an integrated metal test sample. The test sample is movable within the tube under the application of air pressure forth and back through a detection zone along a transfer axis, for which an input signal is measured, and a threshold is determined, which is smaller than the amplitude of the input signal. Subsequently, during test cycles performed between production cycles, the test sample is moved through the detection zone, and the input signal is measured and compared with the threshold to check correct operation of the metal detection apparatus.

For testing the metal detection apparatus with different test samples, the test device is equipped with a corresponding number of tubes that extend into the related aperture of the metal detection apparatus. Depending on the number of tubes that are individually provided with test samples, considerable space may be required for this test device. The cross-section of the aperture available for entering objects is therefore reduced accordingly so that the maximum dimensions for products to be examined is significantly reduced.

Furthermore, for driving test samples through the tubes a pressurized medium and electronically controllable air valves and corresponding electric circuitry are required. Hence, producing and assembling a metal detection apparatus with such a test device requires considerable effort and causes corresponding costs. Further, controlling the speed with which test samples are driven through the detection zone by pressurized air cannot easily be controlled so the adaptation of the speed of the test samples to the speed with which products are conveyed through the detection zone is difficult to achieve. The measurement process for checking test samples can therefore not seamlessly be integrated into the measurement process for checking products requiring further efforts for programming the operation of the metal detection apparatus and the operation of the test device.

Further, the described test device having one or a plurality of tubes with integrated test samples needs to be adapted with considerable effort to the metal detection apparatus on which the device is installed. For a metal detection apparatus with a shorter detection zone, along which the examined items travel, shorter tubes will be required and for a metal detection apparatus with a longer detection zone longer tubes will be required.

Still, further, a voluminous test device with a plurality of tubes may have an adverse effect on the performance of the metal detection apparatus. Such a test device must therefore carefully be adapted to the related metal detection apparatus.

Further, in conventional metal detection apparatuses measurement of products to be examined and measurement of test samples are sequentially executed, so that during test intervals products cannot be examined and the transport of products needs to be interrupted.

The present invention is therefore based on the object of providing a metal detection apparatus having an improved test device and to provide such an improved test device.

It shall be possible to test a metal detection apparatus, that is equipped with an inventive test device, with little effort in a short time interval for a variety of contaminants.

The inventive test device shall allow testing a metal detection apparatus with one or a plurality of test samples and shall still require a minimum of space so that the size of the apertures of the metal detection apparatus is scarcely reduced and products with practically the same dimensions can be driven through the metal detection apparatus and tested.

The installed test device shall not have an adverse effect on the performance of the metal detection apparatus. It shall be possible to locate critical elements of the test device, such as elements comprising steel parts, at a suitable distance from the detection zone so that an adverse impact on measurement processes is avoided.

The test device shall allow conveying test samples forth and back through the detection zone with precisely adjustable speed so that test cycles can be adapted to product cycles and/or the measurement procedures can be facilitated.

Furthermore, manufacturing, assembling, installing, and operating the test device shall be possible with a minimum cost and effort. Still, further, it shall be possible to install the test device on any metal detection apparatus having identical input and output apertures or input and output apertures different in form and/or size.

Furthermore, it shall be possible to install inventive test devices on metal detection apparatuses having detection zones with different dimensions.

Further, it shall be possible to install two or more test devices on a single metal detection apparatus with a minimum space requirement so that test measurements can be made at different locations within the detection zone while the cross-section of the detection zone is scarcely reduced.

It shall be possible to integrate the test device into the metal detection or to mount the test device on any metal detection apparatus that comprises input and output apertures that are delimiting a transfer channel, through which items can be passed for examination. Hence, it shall also be possible to upgrade metal detection apparatuses, which are already in use, with an inventive test device.

Preferably, it shall be possible to test or examine test samples and products to be examined simultaneously so that it is not necessary to interrupt the examination of products during a test interval.

Pressurized air, electronically controlled air valves, and related circuitry shall no longer be required for the test device.

The above and other objects of the present invention are achieved by an improved metal detection apparatus as defined in claim 1 and an improved test device according to claim 15. Advantageous embodiments of the invention are defined in further claims.

The metal detection apparatus comprises a detector housing with an input aperture and an output aperture delimiting a transfer channel, along which products are movable through a coil system that defines a detection zone and that comprises a transmitter coil and a first and a second receiver coil dimensioned such that a current applied to the transmitter coil induces a first receiver coil signal in the first receiver coil and a second receiver coil signal in the second receiver coil, that do not compensate one another when a metal contaminant is present in the detection zone.

The metal detection apparatus further comprises a test device with at least one test sample that is movable through the detection zone, a signal processing unit for processing the receiver coil signals and for detecting signals relating to contaminants and for detecting signals relating to the at least one test sample and a control unit for controlling measurement of products during normal operation and for controlling measurement of the at least one test sample during test intervals.

According to the invention, the test device comprises a first reel unit arranged at the input aperture comprising a first reel drive unit, that is rotatably holding a first reel, a second reel unit arranged at the output aperture comprising a second reel drive unit, that is rotatably holding a second reel, and an elongated windable sample carrier that is extending through the detection zone and that has a first end, which is windably held by the first reel, that has a second end, which is windably held by the second reel and that holds the at least one test sample, and wherein either the first reel drive unit or the second reel drive unit is controllable by the control unit (5) to transfer the at least one test sample (S1, S2, . . .) during test intervals through the detection zone (60), or the first reel drive unit and the second reel drive unit are controllable by the control unit to transfer the at least one test sample during the test intervals through the detection zone.

Since the test device uses an elongated windable sample carrier, which can be small in diameter, possibly even smaller than the cross-section of the test samples, the test device, i.e., the windable sample carrier requires a minimum of space within the detection zone. Hence, even if more than one test unit is mounted or installed, the related windable sample carrier requires only very little space within the detection zone.

Preferably, the windable sample carrier is a tape or a combination of tapes or tape layers, a string or a combination of strings, a rope or a combination of ropes, or a cable or a combination of cables. The windable sample carrier may also be any combination of a tape and/or a string and/or a rope and/or a cable.

Preferably, the windable sample carrier is made of plastic, polyethylene, or bi-axially oriented polyethylene terephthalate. Preferably, the windable sample carrier is a Mylar® tape that is a flexible, strong, and durable film and translucent even in heavier thicknesses. Mylar® is available typically with a thickness in the range of 15µ m to 500µ m.

Preferably, the windable sample carrier is a tape, such as a Mylar® tape, with a width in the range of 5 mm to 15 mm, more preferably in the range of 9 mm to 11 mm, and with a thickness in the range of 25µ m to 75µ m, more preferably in the range of 45µ m to 55µ m. The length of the windable sample carrier is preferably selected under consideration of the length of the detection zone or the detection zones of a series of different metal detection apparatuses.

If a difference in length of the windable sample carrier is exceeding the actual requirement of a specific detection zone, the excess length of the windable sample carrier can be wound onto the reels. Hence, the windable sample carrier can be provided with a standard length for a series of metal detection apparatuses that exhibit detection zones with different dimensions, particularly with different dimensions along the z-coordinate along which the examined products or items travel. A single test device can therefore be adapted without any additional effort to various metal detection apparatuses having detection zones with different dimensions.

The test samples can be bonded to the windable sample carrier for example by means of a tape and adhesive or by thermal bonding. The windable sample carrier may for example consist of two tape layers between which receptacles may be present or between which samples are placed before the two layers are bonded together.

Test samples may comprise or consist of any material, such as ferrous material, non-ferrous material, stainless steel or aluminium, or a combination thereof.

In preferred embodiments, the first reel drive unit and/or the second reel drive unit is a controllable electric motor. If both, the first reel drive unit and the second reel drive unit are electric motors or comprise electric motors, then the electric motors are operated typically synchronously, asynchronously only to tension the windable sample carrier as required.

In further preferred embodiments only the first reel drive unit or the second reel drive unit is a controllable electric motor. The other second or first reel drive unit comprises then preferably an elastic element such as a spring element, possibly a coil spring, which is tensioned when the real drive unit with the electric motor is activated. In this embodiment, only one electric motor needs to be controlled for winding or rewinding the windable sample carrier. In the starting position of the test device, the windable sample carrier is wound around the reel of the reel drive unit, which comprises the coil spring, which in this state is not under tension or is provided with the tension required for winding up the windable sample carrier completely. When the electric motor for example of the first reel drive unit is activated and the windable sample carrier is drawn from the reel of the second reel drive unit, the coil spring gets tensioned. As soon as, the electric motor of the first reel drive unit is deactivated or stepped back the coil spring of the second rewinds the windable sample carrier onto the related reel.

Hence, in all embodiments of the invention, the controllable electric motor or controllable electric motors are preferably stepper motors, which can turn forward and/or backwards in controlled steps so that the transport of the test samples can be done with the desired speed, which may correspond to the speed with which products are conveyed through the detection zone.

In preferred embodiments, the locations of the test sample or the test samples are continuously monitored or determined so that the transport of the test samples and the analysis of the receiver coil signals can easily be synchronized.

Monitoring or determining the locations of the test samples can be done by monitoring the rotations of the shafts of the electric motors or reels for example by inductive sensors or optical sensors or by observing the locations of the transported test samples with any other sensor, such as optical sensors or light barriers.

The inventive test device can be integrated into the metal detection apparatus or can be mounted on the housing or structure of the metal detection apparatus. It is also possible to integrate or mount two or more test devices in or on the metal detection apparatus.

If the test device is integrated into the metal detection apparatus, then the first reel unit and the second reel unit are integrated into the detector housing of the metal detection apparatus. The first reel unit and the second reel unit may then be contained in a reel housing or not.

If the test device is not integrated into the metal detection apparatus, then the first reel unit and the second reel unit each comprise a reel housing attached or attachable to the detector housing or detector structure and provided with a transfer port through which the windable sample carrier can pass in and out of the reel housing.

Preferably, the windable sample carrier is routed from the first reel unit freely or partly, or fully enclosed within a guide channel to the second reel unit. The reel housings and the guide channel connected thereto are preferably tightly sealed towards the outside so that no gases or humidity can reach the windable sample carrier. Hence the reel housings are preferably provided with compression seals, with which the openings towards the guide channel and cover elements are closed.

The reel units preferably comprise guide elements held within the reel housing or integrated or moulded into the reel housing with which the windable sample carrier is guided towards the transfer port and possibly the guide channel, if installed. The guide element may also be a roller held by a pivot shaft. Preferably, the guide element is held by a spring-loaded lever, which ensures that the windable sample carrier is always provided with the same tension.

For the metal detection apparatus, preferably a metal-free zone is defined, in which metal that may disturb measurement processes, shall not be present. If such a metal-free zone is defined, then the first reel drive unit and the second reel drive unit are preferably located outside this metal-free zone.

The control unit comprises a control program with an operating module for controlling the metal detection apparatus during normal operation and a test module for controlling the metal detection apparatus and the test device during test intervals in order to sequentially or simultaneously test the test samples and products to be examined.

The signal processing unit is preferably designed to store the signals of the test samples and to subtract a signal of a test sample under test from the receiver coil signal when test samples and products are simultaneously tested or examined. If test samples and products are simultaneously tested or examined and the signal of the test sample is subtracted from the receiver coil signal then the remaining difference signal should be zero or below a specified threshold, if no contaminant is present in the product. However, if a contaminant is present in the product the remaining difference signal will not be zero or below the specified threshold. Consequently, tests can be executed in parallel to the examination of products.

If test samples and products are simultaneously tested or examined the degradation of the test signal is preferably monitored and recalibration of the metal detection apparatus is scheduled accordingly.

DETAILED DESCRIPTION OF EXEMPLARY EMBODIMENT(S)

Figure 1:
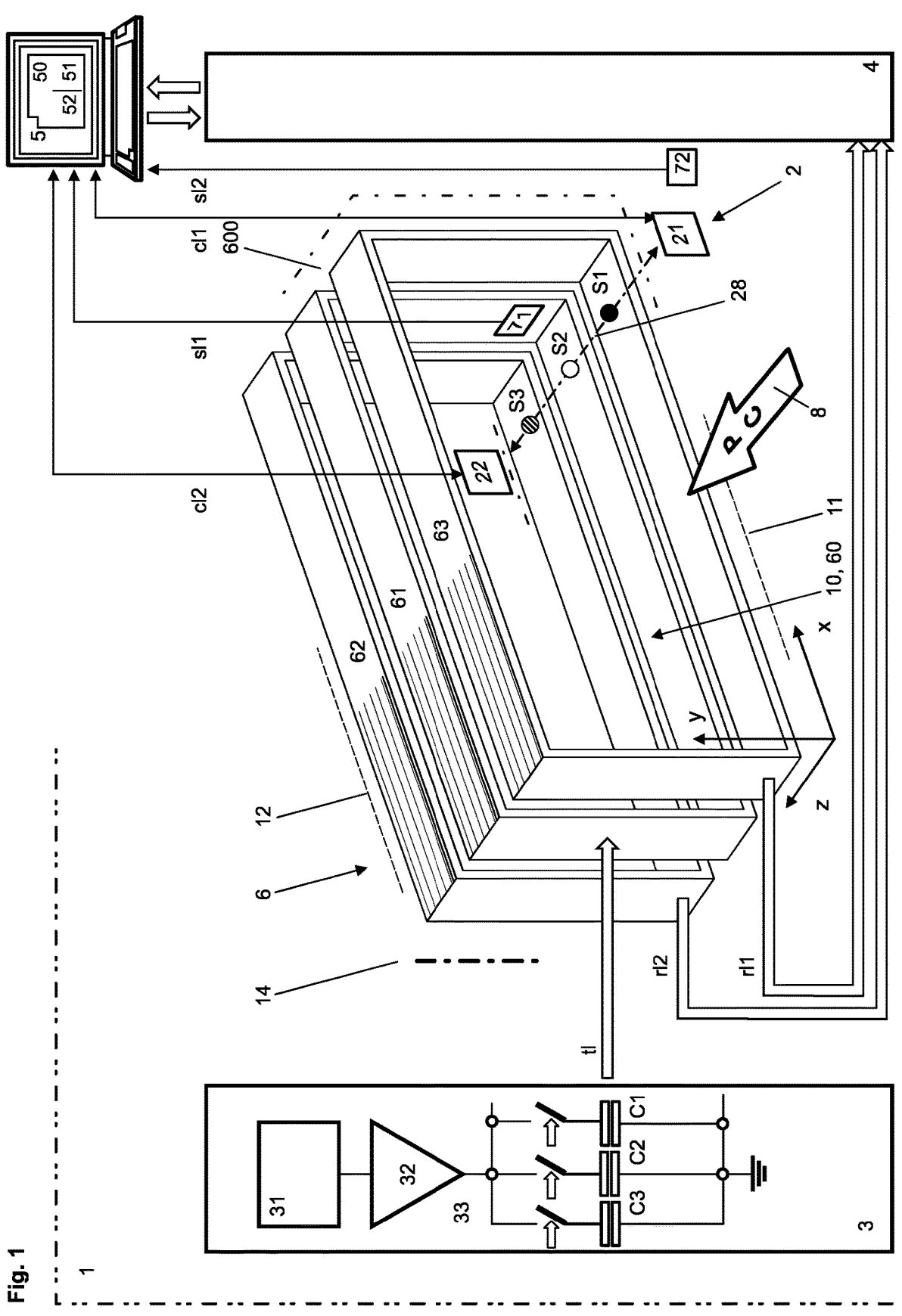
FIG. 1 is a schematic illustration of an exemplary metal detection apparatus in accordance with the present invention.

FIG. 1 shows schematically an inventive metal detection apparatus 1 with a control unit 5, with a balanced coil system 6 that encloses a detection zone 60, with a transfer channel 10 delimited by an input aperture 11 and an output aperture 12 and with a test device 2 that comprises, arranged at the input aperture 11, a first reel unit 21 with a first reel drive unit 271 rotatably holding a first reel 291, arranged at the output aperture 12, a second reel unit 22 with a second reel drive unit 272 rotatably holding a second reel 292, and an elongated windable sample carrier 28 that is extending through the detection zone 60 of the metal detection apparatus 1 and that has a first end windably held by the first reel 291 a second end windably held by the second reel 292, and that holds a plurality of test samples S1, S2, S3.

In exemplary embodiments, without limitation, the metal detection apparatus 1 comprises a transmitter unit 3, a balanced coil system 6, a signal processing unit 4, a control unit 5, and a test device 2, with which test samples S1, S2, S3 are transferable through the coil system 6 during test intervals. Further shown is a coordinate system with axes x, y, and z. The z-axis extends in parallel to a transport axis along which products are transported through the coil system by means of a conveyor 8 or by means of gravity.

The balanced coil system 6 comprises a transmitter coil 61, a first receiver coil 62, and a second receiver coil 63, which enclose a detection zone 60.

With a dashed line, the detector housing 14 of the metal detection apparatus 1 is symbolized. With further dashed lines, the input aperture 11 and the output aperture 12 are symbolized which delimit a transfer channel 10 through which products P, which may contain contaminants C, are conveyed by means of the conveyor 8 or by means of gravity. The first and second apertures 11, and 12 are aligned in parallel to a plane defined by the vectors x and y of the coordinate system. The products P and test samples S1, S2, and S3 are conveyed in parallel to the z-axis through the detection zone 16 of the coil system 6. With another dashed line the borders of a metal-free zone are drawn, into which no metallic items should be introduced that could disturb the operation of the metal detection apparatus 1.

The transmitter unit 3, which could be provided in any known embodiment, comprises in the given example a frequency generator 31 that provides a signal with an operating frequency to the input of a power amplifier 32. The output of the power amplifier 32 is connected via a transmitter line t1 to the transmitter coil 61, which is connected to a switch bank 14 with capacitors C1, C2, and C3, which can individually be connected to the transmitter coil 61. With the selectable capacitors C1, C2, and C3 the transmitter coil 61 can be tuned to a transmitter frequency selected by the control unit 5 at the frequency generator 11.

The transmitter signal applied to the transmitter coil 61 induces a first coil signal in the first receiver coil 62 and a second coil signal in the second receiver coil 63, which do not compensate one another when metal C is present in the detection zone 60 of the coil system 6. However, when metal C is present in a product P entering the detection zone 60, the signals of the receiver coils 62, 63 provide a difference signal, which is forwarded via receiver lines rl1, and rl2 to the signal processing unit 4.

The signal processing unit 4, which can also be provided with any known design, comprises signal processing devices such as hardware and/or software modules used for amplifying, filtering, demodulating, and processing the receiver coil signals.

The processed signal is forwarded from the signal processing unit 4 to the control unit 5. The control unit 5 comprises a control program 50 with which the metal detection apparatus 1 can be controlled during normal operation and during test intervals. For controlling the metal detection apparatus 1 during normal operation the control program 50 comprises an operating module 51 and for controlling the metal detection apparatus 1 during test intervals the control program 50 comprises a test module 52. The operating module 51 and the test module 52 preferably interact with one another so that the test module 52 can use services of the operating module 51.

In the signal processing unit 4 or in the control unit 5, the processed signal is compared with a threshold. If the threshold is exceeded by the input signal the presence of a metallic item, a contaminant C during normal operation, or a test sample S1, S2, S3 during a test interval, is detected. If a contaminant C is detected during normal operation an alarm is raised and the contaminated product P under test is removed from the product chain. The detection of a test sample S1, S2, and S3 during a test interval indicates that the metal detection apparatus 1 is in order and capable of detecting contaminants. However, if a test sample S1, S2, or S3 that has been transferred through the detection zone 60 during the test interval, has not caused the processed signal to rise above the given threshold then the control unit 5 indicates for example by an alarm that the performance of the metal detection apparatus 1 has degraded to an unsatisfactory state and recalibration or maintenance is required.

The test device 2 comprises a first reel unit 21 arranged at the input aperture 11 and comprising a first reel drive unit 271, which is rotatably holding a first reel 291 (see FIG. 6), a second reel unit 22 arranged at the output aperture 12 and comprising a second reel drive unit 272, that is rotatably holding a second reel 292 (see FIG. 6), and an elongated windable sample carrier 28 that is extending through the detection zone 60 of the metal detection apparatus 1 and that has a first end, which is windably held by the first reel 291, that has a second end, which is windably held by the second reel 292, and that holds in the given example three test samples S1, S2, S3.

FIG. 1 shows that in this preferred embodiment, a metal-free zone 600 has been defined, and the first reel unit 21 and the second reel unit 22 are located outside the metal-free zone 600 and have therefore no adverse influence on the measurement processes executed with the metal detection apparatus 1. The length of the windable sample carrier 28 can be selected such that the first reel unit 21 and the second reel unit 22 can be mounted well away from the coil system 6. A further advantage is that the test device 2 can be mounted on different metal detection apparatuses 1 having different dimensions and extend with different lengths in the direction parallel to the z-axis of the coordinate system or the transport axis of the products P.

The first reel drive unit 271 or the second reel drive unit 272 or the first reel drive unit 271 and the second reel drive unit 272 are controllable by a control unit 5 to transfer the test samples S1, S2, S3 during the test interval through the detection zone 60. The first reel unit 21 or the first reel drive unit 271 is controlled by control commands via control line cl1. The second reel unit 22 or the second reel drive unit 271 is controlled by control commands via control line cl2 (see also FIG. 6).

The first reel drive unit 271 and/or the second reel drive unit 272 is or comprises a controllable electric motor, such as a stepper motor. If the first reel drive unit 271 and the second reel drive unit 272 comprise a control electric motor, then the motors are preferably synchronously driven to avoid undesirable tension in the windable sample carrier 28. However, with a temporary difference in the velocity of the rotation of the motor shafts, the windable sample carrier 28 can be tensioned.

If only one electric motor is present, then the other reel drive unit 271 or 272 may comprise a coiled spring 273 (symbolically shown in FIG. 6), which can rewind the windable sample carrier 28. The operation of such a drive unit, which comprises a coiled spring, is explained for example in U.S. Pat. No. 2,992,450A. Typically, one end of the coil spring is fixed while the other end is turned together with and preferably around a drive shaft.

By means of the first and second reel units 21, 22, the elongated windable sample carrier 28 can be driven toward the first reel unit 21 and back toward the second reel unit 22. The control unit 5 can therefore initiate test intervals in which the test samples S1, S2, S3 are guided serially through the detection zone 60. The distance between the individual test samples S1, S2, S3 is preferably selected such that only one of the test samples S1 or S2 or S3 is present within the detection zone 60 and the other test samples S2, S3 or S1, S3 or S1, S2 are still outside the detection zone 60 and thus do not influence the test measurement.

A further advantage of the test device 2 is therefore that the test samples S1, S2, S3 can be conveyed or transferred individually to the detection zone and in a controlled manner. By suitable measurement devices or sensors 71, 72, which are connected via measurement lines sl1, sl2 to the control unit 5, and the program module 52 the location of the moving test samples S1, S2, S3 can precisely be tracked within the detection zone 60. Hence, if desired, the movement of the test samples S1 or S2 or S3 can be synchronized with the movement of the transferred products P, for example, if test samples S1 or S2 or S3 and products P are simultaneously observed.

It is therefore possible to interrupt the transport of products P during the test intervals so that no product P or only examined products P, which are free from contaminants C, are present within the detection zone 60. Signals or difference signals occurring during the test intervals are therefore caused by the test samples S1, S2, S3 only.

Since signals caused by the products P and signals caused by each one of the test samples S1, S2, S3, as well as related difference signals can be measured and stored, it is also possible to execute test intervals during normal operation. In this mode of operation, products P and test samples S1, S2, S3 are simultaneously, preferably with the same speed, conveyed or transferred through the detection zone 60. The resulting measurement signal can therefore be predicted based on pre-stored test values, and a deviation therefrom can be measured or determined. Such a deviation from an expected value would indicate that either a contaminant C is present in the examined product P or an undesirable change in the performance of the metal detection apparatus 1 has occurred.

The speed with which the test samples S1 or S2 or S3 are transferred through the detection zone 60 can easily be controlled by the control unit 5. With position sensors 71, e.g., optical sensors and/or motor sensors 72, with which the rotations of the electric motors can be observed, the position of the products P and/or the position of the test samples S1 or S2 or S3 can be measured and/or calculated under consideration of the conveying speed of the products P and the test samples S1, S2, S3.

If the transport speed of the products P and the test samples S1, S2, S3 is equal, then the arrival of a product at the first aperture can be detected for example by means of a light barrier and a test sample S1, S2, S3 can quickly be brought to the same position along the z-axis of the coordinate system and then be transferred with the same speed as the product P through the detection zone 60. Hence, the transport of the test samples S1, S2, S3 towards and away from the detection zone can be done at higher speed than the transport of the test samples S1, S2, S3 through the detection zone 60.

Hence, in preferred embodiments, the conveying speed or transport speed of the products P and/or the test samples S1, S2, S3 can be controlled and adapted as desired and the position of the products P and/or the test samples S1, S2, S3 can be measured or determined by the application of kinematic rules.

Figure 2:
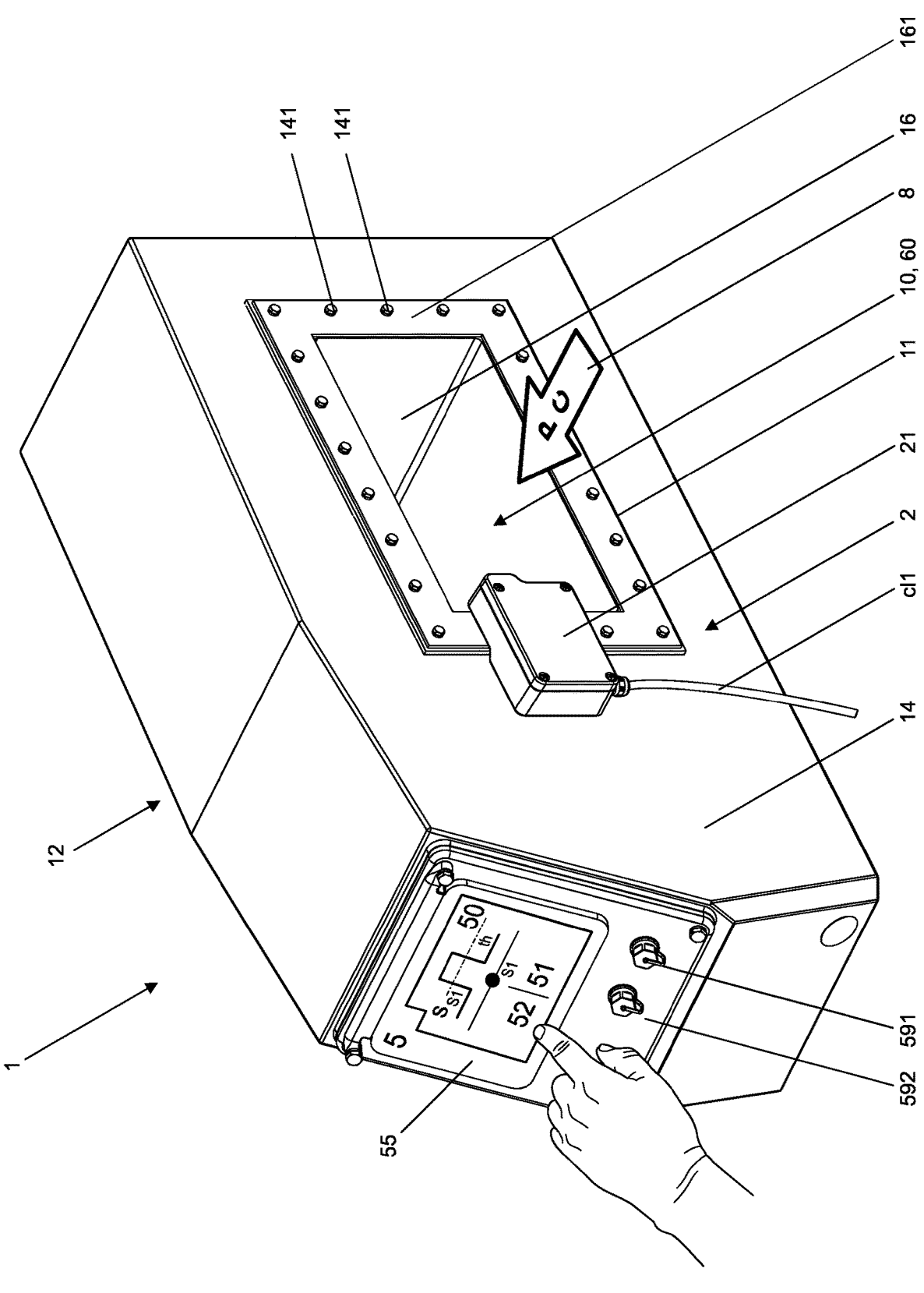
FIG. 2 is a perspective view of the metal detection apparatus of FIG. 1 with an exemplary test device in accordance with the present invention.

FIG. 2 shows a preferred embodiment of a metal detection apparatus 1 (e.g., of FIG. 1) that is equipped with an inventive test device 2 and a control unit 5 which can be operated or programmed by means of a touch panel 55. It is shown that the operator can select normal operation mode by activating the operating module 51 or test mode by activating the test module 52. The operator has selected the test module 52 and has initiated a test cycle in which a test sample S1 is being transferred through the transfer channel 10 and the detection zone 60. On the touch panel 55 the position of the test sample S1 within the transfer channel 10 and a detected signal $s_{S1}$ that exceeds a predetermined threshold th is displayed. The test module 51 preferably allows setting up a schedule for executing test intervals so that no further interaction by the operator is required.

The metal detection apparatus 1 has rectangular apertures 11, 12 of equal size. The inventive test device 2 can however be installed on any metal detection apparatuses with any form and equal or unequal size of apertures 11, 12.

The transfer channel 10 is enclosed by a channel frame 16, which is adjoined on the front side and back side by rectangular mounting flanges 161 that are connected to the detector housing or detector structure 14 by means of mounting screws 141.

Figure 4:
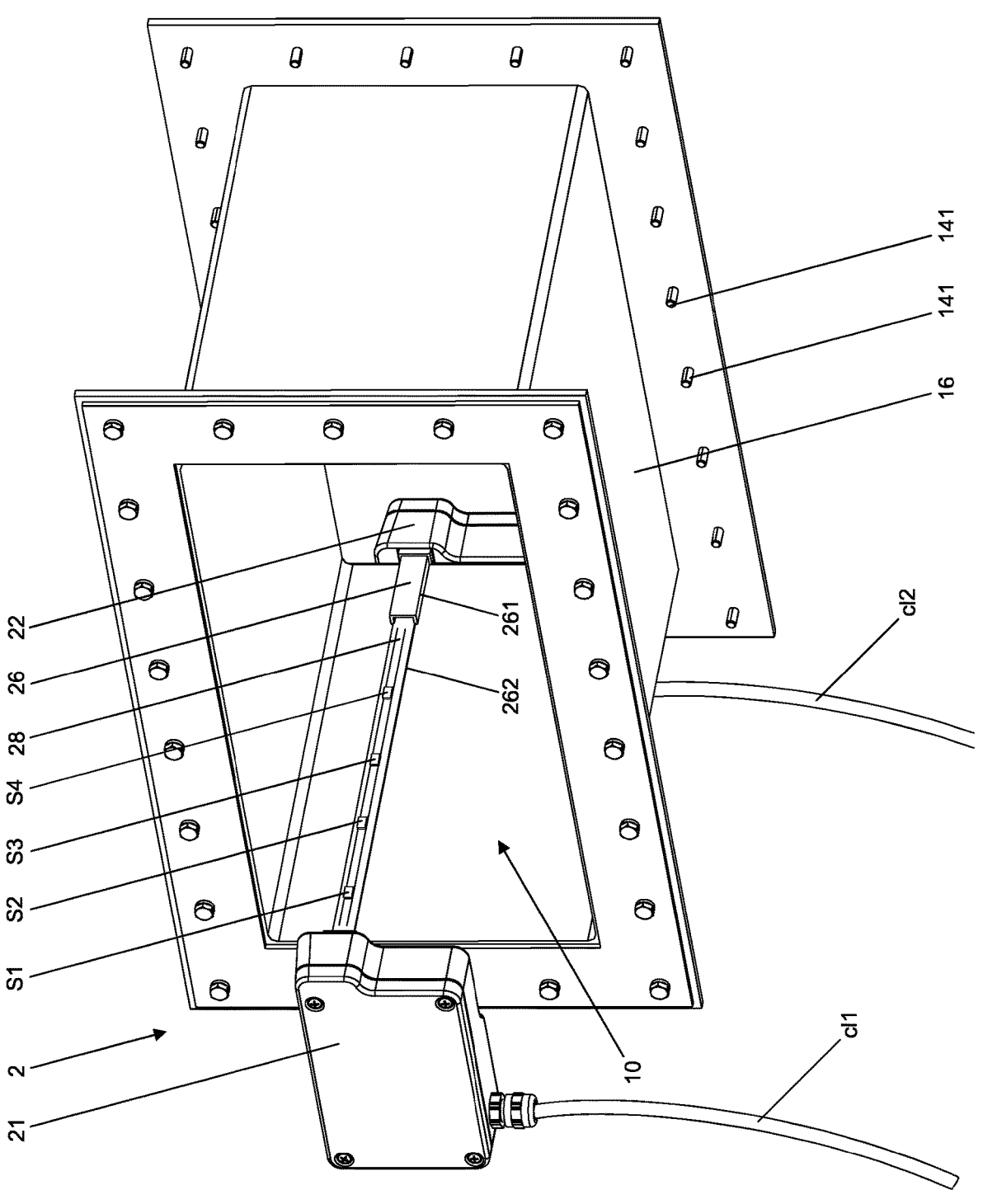
FIG. 4 is another perspective view of the test device of FIG. 3.

Further, as shown in FIG. 4, the first reel unit 21 is mounted at the input aperture 11 and the second reel unit 22 is mounted at the output aperture 12 of the metal detection apparatus 1 and the elongated sample carrier 28 is traversing the transfer channel from the first reel unit 21 to the second reel unit 22. The first reel unit 21 and the second reel unit 22 are externally mounted on the detector housing 14 but could also be integrated into the metal detection apparatus 1. Control lines cl1, cl2 extending from the first and second reel units 21, 22 preferably comprise connectors which can be connected to the control unit 5 via sockets 591, 592 located example at the front side of the metal detection apparatus 1.

Figure 3:
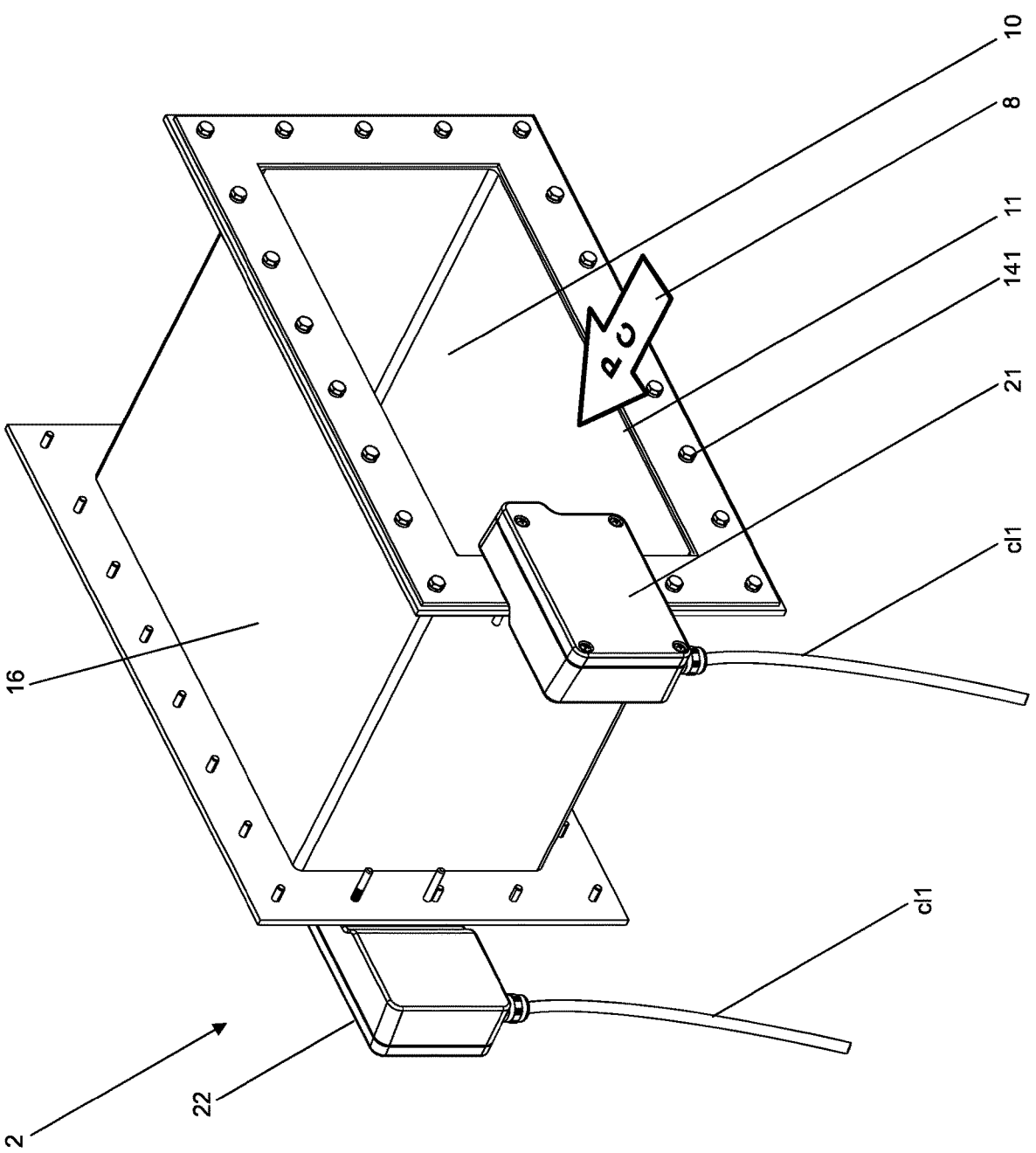
FIG. 3 is a perspective view of the test device of FIG. 2 illustrated in isolation from certain other components thereof.

FIG. 3 shows the test device 2 of FIG. 2 with the first reel unit 21 and the second reel unit 22 mounted on opposite sides of the channel frame 16 which encloses the transfer channel 10 of the metal detection apparatus 1 of FIG. 2.

FIG. 4 shows the test device 2 mounted on the channel frame 16 of FIG. 3 seen from a different angle with a view into the transfer channel 10 which is traversed by the windable sample carrier 28 on which four test samples S1, S2, S3, and S4 are mounted typically in higher distances from one another as indicated. For example, test sample S1 comprises ferrous material, test sample S2 comprises non-ferrous material, test sample S3 comprises stainless steel and test sample S4 comprises aluminium.

It is shown that the windable sample carrier 28 is guided within a guide channel 26 having a rectangular cross-section and comprising a first channel member 261 having a U-profile and a second channel member 262 being a flat plate that covers the first channel member 261. The windable sample carrier 28 is a flat tape, for example a Mylar® tape with dimensions as defined above.

Figure 5:
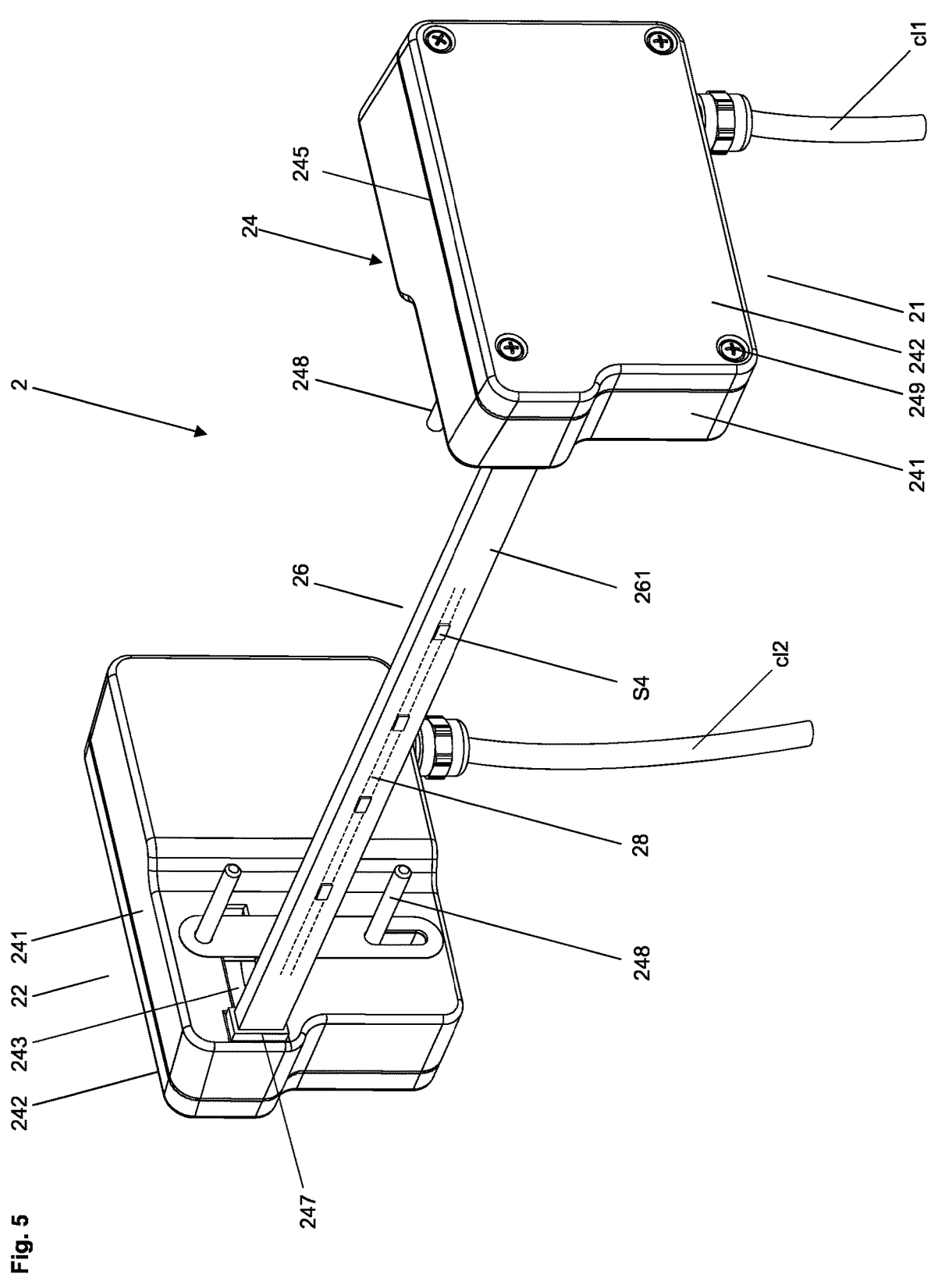
FIG. 5 is a perspective view of the test device of FIG. 4 illustrated in isolation from certain other components thereof.

FIG. 5 shows the test device 2 of FIG. 4 without the channel frame 16 with the reel units 21, 22, which comprise each a reel housing 24 with a housing shell 241 and a housing cover 242 that are sealingly connected by a sealing gasket 245 and connecting screws 249. The reel housings 24 of the reel units 21, 22 are connected to one another by a guide channel 26, through which the windable sample carrier 28 (shown symbolically) is guided. The connections between the reel housings 24 and the guide channel 26 are closed by fittings or pressure seals 247, so that the interior of the reel units 21, 22 and the guide channel 28 are tightly sealed against ingress. Preferably, the sealing meets a predetermined standard for ingress protection.

Figure 7:
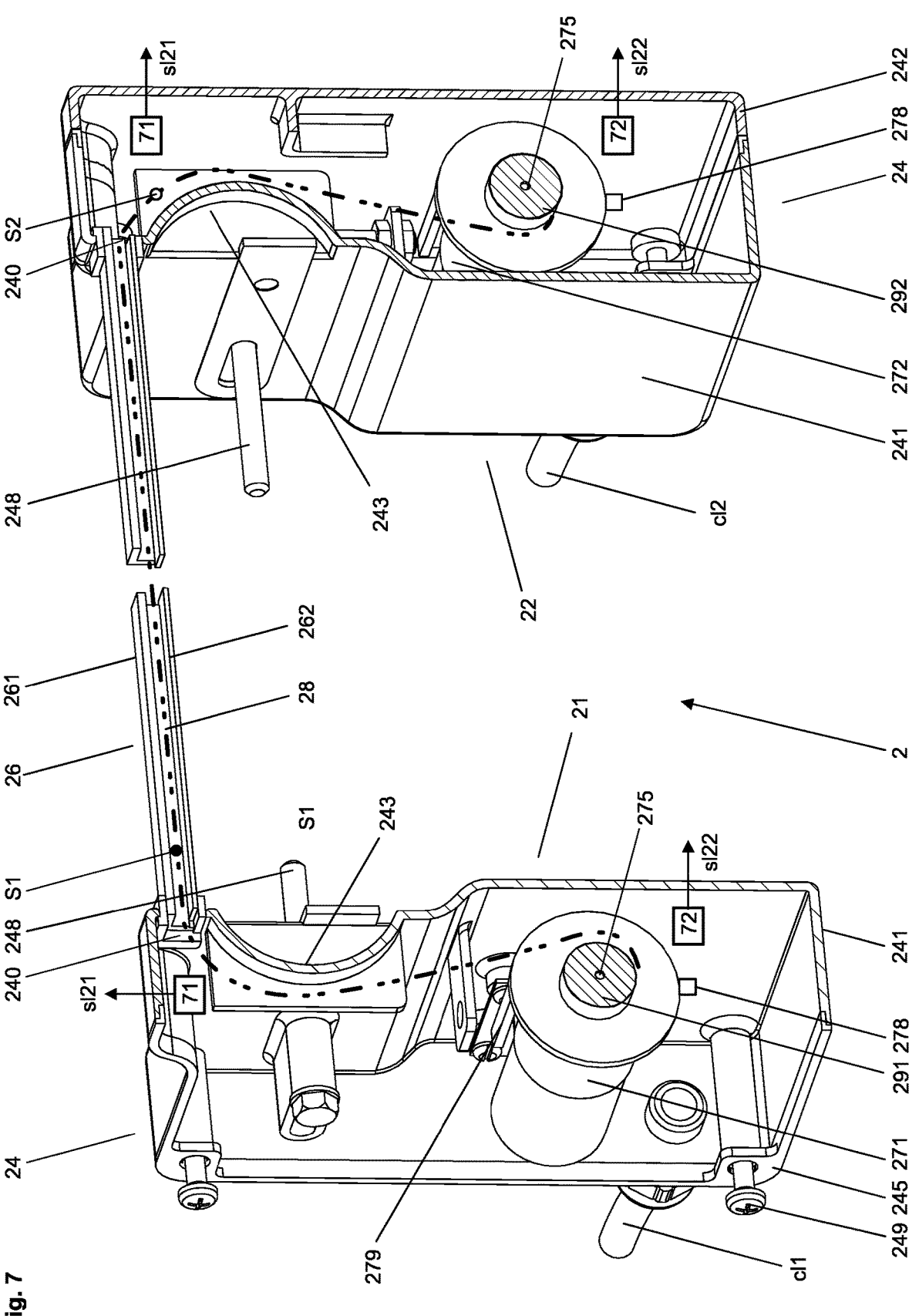
FIG. 7 is a perspective, sectional view of the test device taken along section line A-A of FIG. 6.

The housing shell 241 can be connected to the detector housing 14 or detector structure by mounting screws 248. FIG. 5 shows further that the housing shell 241 comprises a moulded depression 243 which serves as a guide element as shown in FIG. 7.

Figure 6:
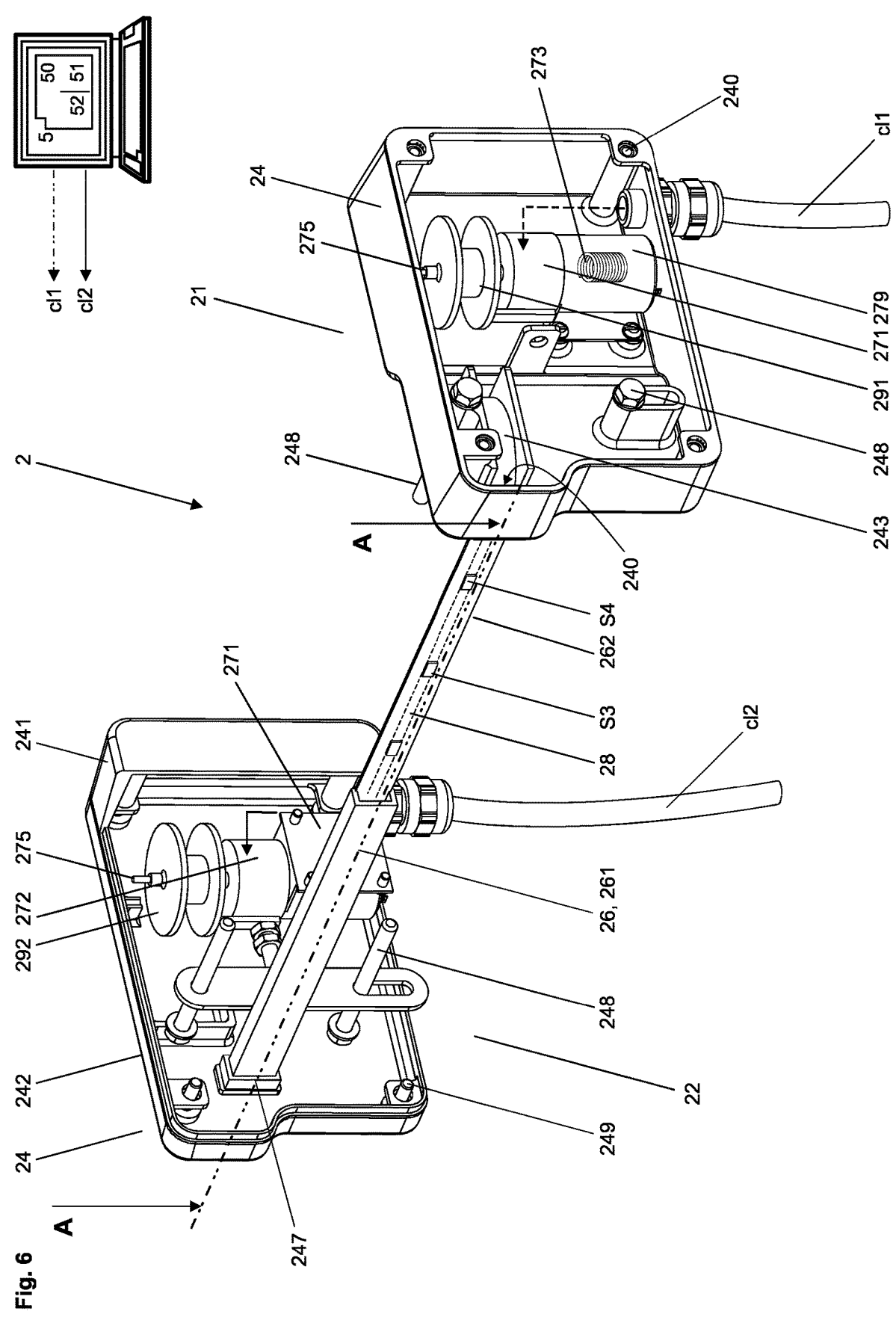
FIG. 6 is a perspective, schematic view of the test device of FIG. 5 with certain components not shown to illustrate internal components thereof.

FIG. 6 shows the test device 2 of FIG. 5 with the first reel unit 21 without the housing cover 242 and the second reel unit 22 with the housing shell 241 in sectional view. It is shown that the reel units 21, 22 are equipped with reel drive units 271, 272, which are connected each to a control line cl1, cl2 and which have a drive shaft 275 on which the related reel 291, 292 is coaxially mounted. The windable sample carrier 28, which is provided in the embodiment of a tape, is wound with one end around the first reel 291 held by the first reel drive unit 271 and is wound with the other end around the second reel 292 held by the second reel drive unit 272 (shown in FIG. 7). Hence, by controlling the first and the second reel drive units 271, 272 accordingly, the windable sample carrier 28 can be wound on the first reel 291 or on the second reel 292. Of course, the transport of the windable sample carrier 28 is always stopped before it is detached from one of the reels 291, 292. For this purpose, the end positions of the windable sample carrier 28 are preferably observed by one of the sensors 71, 72.

The windable sample carrier 28 enters the housing 24 through a transfer port 240. Adjacent to the transfer port 240 a guide element 243 is provided, around which the windable sample carrier 28 is smoothly guided towards the related first or second reel 291, 292. As stated above the windable sample carrier 28 could also be guided by a roller that is preferably held by a spring-loaded lever.

As stated, it is possible to equip only one of the reel units 21, 22 with a controllable electric motor. Schematically it is shown, that the first reel drive unit 271 comprises a coil spring 273 instead of an electric motor. In this configuration, the electric motor in the second reel drive unit 272 can draw the windable sample carrier 28 from the first reel 291 and therefore simultaneously turns the drive shaft 275 of the first reel drive unit 271, which turns one end of the coil spring 273, while the other end of the coil spring 273 is firmly held. By this process, the coil spring 273 is tensioned so that it can rewind the windable sample carrier 28 automatically back onto the first reel 291 as soon as the electric motor of the second reel drive unit 272 is switched off or stepped back allowing the second reel 292 to turn back.

FIG. 7 shows the test device 2 cut along line A-A shown in FIG. 6. A part of the housings 24 and a part of the first and second reels 291, 292 is cut away. It can be seen how the windable sample carrier 28 is forwarded via the moulded guide elements 243 to the first and second reels 291, 292.

It is further shown that flags 278 are attached to the reels 291 and 292, which are sensed by optical or inductive sensors 72 to detect rotations of the drive shafts 275. Optical or inductive sensors 71 are also located near the transfer openings 240 of the reel housings 24. Test samples S1, S2 can therefore be located at the transfer openings 240. By observing the rotations of the drive shafts 275, the position of the test sample S1 or S2 within the guide channel 26 can be calculated. Further, it is shown that the first test sample S1 leaves the guide channel 26 before the second test sample S2 enters the guide channel 26. Hence, there is preferably only one test sample S1 or S2 present in the guide channel.

REFERENCE SIGNS LIST 1 metal detection apparatus
10 transfer channel
11 input aperture
12 output aperture
14 detector housing
141 mounting screws
16 channel frame 161 mounting flange
2 test device
21 first reel unit
22 second reel unit
24 reel housing
240 transfer port
241 housing shell
243 guide element
244 threaded bore
245 sealing gasket
248 mounting screw
249 connecting screw
26 guide channel
261 first channel member
262 second channel member
263 fitting, preferably compression seal
271 first reel drive unit
272 second reel drive unit
273 reel drive unit spring (optional)
275 drive shaft
278 flag
279 mounting bracket
28 windable sample carrier
291 first reel
292 second reel
3 transmitter unit
31 frequency generator
32 power amplifier
33 switch bank
4 signal processing unit
5 control unit
50 control program
51 operating module
52 test module
55 touch panel
591, 592 sockets
6 balanced coil system
60 detection zone
600 metal-free zone
61 transmitter coil
62 first receiver coil
63 second receiver coil
71 sample sensor
72 motor sensor
8 conveyor
P product
C contaminant
S1, S2, S3 test samples
C1, C2, C3 capacitors
cl1, cl2 control lines
rl1, rl2 receiver lines
sl1, sl2 receiver lines
t1 transmitter line
P product

What is claimed is:

1. A metal detection apparatus for detecting contaminants in a product stream conveyed by a conveyor or gravity, comprising:

a detector housing comprising:
an input aperture; and
an output aperture delimiting a transfer channel along which products are movable through a coil system that defines a detection zone, and that comprises a transmitter coil and a first and a second receiver coil dimensioned such that a current applied to the transmitter coil is configured to induce a first receiver coil signal in the first receiver coil and a second receiver coil signal in the second receiver coil that do not compensate one another when a metal contaminant is present in the detection zone;

a signal processing unit for processing the receiver coil signals and for detecting signals relating to contaminants and for detecting signals relating to at least one test sample; and a control unit for controlling measurement of products during normal operation and for controlling measurement of the at least one test sample during test intervals;

a test device comprising:
the least one test sample that is movable through the detection zone;

a first reel unit arranged at the input aperture and comprising a first reel drive unit that is rotatably holding a first reel;

a second reel unit arranged at the output aperture and comprising a second reel drive unit that is rotatably holding a second reel; and an elongated windable sample carrier extending through the detection zone having a first end which is windably held by the first reel and a second end which is windably held by the second reel, wherein said elongated windable sample carrier holds the at least one test sample;

wherein either:
the first reel drive unit or the second reel drive unit is controllable by the control unit to transfer the at least one test sample during the test intervals through the detection zone; or the first reel drive unit and the second reel drive unit are controllable by the control unit to transfer the at least one test sample during the test intervals through the detection zone.

2. The metal detection apparatus of claim 1, wherein:
the first reel drive unit or the second reel drive unit is a controllable electric motor; or
the first and the second reel drive units are controllable electric motors, which are driven, except for tensioning the windable sample carrier, synchronously during the test intervals; or
the first reel drive unit is a controllable electric motor and the second reel drive unit comprises a spring that is tensioned when the second reel is turned; or
the second reel drive unit is a controllable electric motor and the first reel drive unit comprises a spring that is tensioned when the first reel is turned.

3. The metal detection apparatus of claim 1, wherein:
the windable sample carrier is a tape or a combination of tapes, a string or a combination of strings, a rope or a combination of ropes, or a cable or a combination of cables.

4. The metal detection apparatus of claim 3, wherein:
the windable sample carrier is made of plastic, polyethylene or bi-axially oriented polyethylene terephthalate, or the windable sample carrier is a Mylar tape.

5. The metal detection apparatus of claim 1, wherein:
the at least one test sample is made of ferrous material, non-ferrous material, stainless steel or aluminium or a combination thereof.

6. The metal detection apparatus of the claim 1, wherein:
a plurality of test samples are provided which are separately attached or bonded to the windable sample carrier with regular or irregular distances from one another.

7. The metal detection apparatus of claim 1, further comprising:

at least one sample sensor, with which the at least one test sample is observable at a specific location within the detection zone; and/or at least one motor sensor, with which rotations of the reel in the first reel unit or in the second reel unit is observable.

8. The metal detection apparatus of claim 1, wherein:

the first reel unit and the second reel unit are integrated into the detector housing, or that the first reel unit the and the second reel unit each comprise a reel housing attached or attachable to the detector housing and provided with a transfer port through which the windable sample carrier can pass.

9. The metal detection apparatus of claim 8, wherein:

the first reel unit comprises a guide element held within the reel housing or integrated or moulded into the reel housing; or the second reel unit comprises a guide element held within the reel housing or integrated or moulded into the reel housing; or the first reel unit and the second reel unit each comprise a guide element held within the reel housing or integrated or moulded into the reel housing.

10. The metal detection apparatus of claim 1, wherein:

the windable sample carrier is routed from the first reel unit freely or partly or fully enclosed within a guide channel to the second reel unit.

11. The metal detection apparatus of claim 1, wherein:

a metal-free zone is defined around the detection zone; and the first reel drive unit and the second reel drive unit are located outside the metal-free zone.

12. The metal detection apparatus of claim 1, further comprising:

two or more of the test device, each of which are individually controllable by the control unit.

13. The metal detection apparatus of claim 1, wherein:

the control unit comprises a control program with an operating module for controlling the metal detection apparatus during normal operation and a test module for controlling the metal detection apparatus and the test device during a test interval in order to sequentially or simultaneously test the test samples and products to be examined.

14. The metal detection apparatus of claim 1, wherein:

the signal processing unit is configured to store the signals of the test samples and to subtract the signal of the test sample under test from the receiver coil signals when test samples and products are simultaneously tested.

15. A test device for a metal detector for detecting contaminants in a product stream conveyed by a conveyor or gravity, said test device comprising:

a first reel unit arranged at an input aperture of the metal detector and comprising a first reel drive unit that rotatably holds a first reel;

a second reel unit arranged at an output aperture of the metal detector and comprising a second reel drive unit that rotatably holds a second reel, wherein at least said output aperture delimits a transfer channel of the metal detector along which products are movable through a coil system of the metal detector and that defines a detection zone that comprises a transmitter coil and a first and a second receiver coil dimensioned such that a current applied to the transmitter coil is configured to induce a first receiver coil signal in the first receiver coil and a second receiver coil signal in the second receiver coil that do not compensate one another when a metal contaminant is present in the detection zone; and an elongated windable sample carrier that extends through the detection zone, has a first end which is windably held by the first reel, a second end which is windably held by the second reel, and holds the at least one test sample;

wherein either:

the first reel drive unit or the second reel drive unit is controllable by the control unit to transfer the at least one test sample during the test intervals through the detection zone; or the first reel drive unit and the second reel drive unit are controllable by the control unit to transfer the at least one test sample during the test intervals through the detection zone.

16. A test device for a metal detector for detecting contaminants in a product stream conveyed by a conveyor or gravity, said test device comprising:

reel units, each arranged at one of an input aperture and an output aperture of the metal detector, each comprising a reel drive unit that rotatably holds a reel, wherein said input aperture and output aperture delimit, at least in part, a transfer channel of the metal detector along which products are movable through a coil system of the metal detector that defines a detection zone, said coil system comprising a transmitter coil and receiver coils dimensioned such that a current applied to the transmitter coil is configured to induce a receiver coil signal in each of the receiver coils, respectively, that do not compensate one another when a metal contaminant is present in the detection zone; and an elongated windable sample carrier holding the at least one test sample and extending through the detection zone, said elongated windable sample carrier having a first end windably held by the first reel and a second end windably held by the second reel;

wherein either or both of the reel drive units are controllable by the control unit to transfer the at least one test sample through the detection zone during the test intervals.

* * * * *